(12) United States Patent
Mowrey et al.

(10) Patent No.: US 8,793,730 B2
(45) Date of Patent: Jul. 29, 2014

(54) ENTERTAINMENT COMPANION CONTENT APPLICATION FOR INTERACTING WITH TELEVISION CONTENT

(75) Inventors: David Mowrey, Atlanta, GA (US); Laura Poffenberger, Atlanta, GA (US)

(73) Assignee: Yahoo! Inc., Sunnyvale, CA (US)

( * ) Notice: Subject to any disclaimer, the term of this patent is extended or adjusted under 35 U.S.C. 154(b) by 211 days.

(21) Appl. No.: 12/982,811

(22) Filed: Dec. 30, 2010

(65) Prior Publication Data

US 2012/0174155 A1  Jul. 5, 2012

(51) Int. Cl.
*H04N 5/445* (2011.01)
*H04N 21/431* (2011.01)
*H04N 21/41* (2011.01)
*H04N 21/236* (2011.01)

(52) U.S. Cl.
CPC ......... *H04N 21/431* (2013.01); *H04N 21/4104* (2013.01); *H04N 21/4126* (2013.01); *H04N 21/23614* (2013.01)
USPC .............. 725/40; 725/133; 725/153

(58) Field of Classification Search
CPC .................. H04N 21/23614; H04N 21/4126; H04N 21/4104; H04N 21/431
USPC ............................................ 725/40, 133, 153
See application file for complete search history.

(56) References Cited

U.S. PATENT DOCUMENTS

| | | | |
|---|---|---|---|
| 5,818,441 A * | 10/1998 | Throckmorton et al. ..... | 715/717 |
| 6,263,505 B1 | 7/2001 | Walker et al. ................. | 725/110 |
| 2002/0078006 A1 * | 6/2002 | Shteyn ............................... | 707/1 |
| 2004/0268413 A1 | 12/2004 | Reid et al. ...................... | 725/131 |
| 2008/0083003 A1 * | 4/2008 | Biniak et al. ................... | 725/110 |
| 2009/0199098 A1 * | 8/2009 | Kweon et al. .................. | 715/716 |
| 2009/0320066 A1 * | 12/2009 | Soldan et al. .................... | 725/37 |
| 2010/0251292 A1 * | 9/2010 | Srinivasan et al. ............... | 725/37 |
| 2010/0306805 A1 * | 12/2010 | Neumeier et al. .............. | 725/60 |
| 2011/0273625 A1 * | 11/2011 | McMahon et al. ............ | 348/734 |
| 2011/0321107 A1 * | 12/2011 | Banks ............................ | 725/110 |
| 2012/0112986 A1 * | 5/2012 | McCoy et al. .................. | 345/2.3 |

* cited by examiner

*Primary Examiner* — Pankaj Kumar
*Assistant Examiner* — Sahar Baig
(74) *Attorney, Agent, or Firm* — Martine Penilla Group, LLP

(57) ABSTRACT

Methods and system for providing companion content at a secondary device for a content being rendered on a main device includes establishing a connection between the secondary device and a device that interfaces with the main device so as to enable the secondary device to access and control the content being rendered on the main device. The method further includes detecting data associated with the content being rendered on the main device through the connection, wherein the data includes metadata associated with the content rendered on the main device. The metadata is communicated to a remote application over the internet. The remote application is configured to analyze the metadata to produce communication content that relates to the content rendered on the main device. Companion content for the content being rendered on the main device is obtained from the remote application and rendered on the secondary device while the content is rendering on the main device. The analysis of the metadata detects changes in the content being rendered on the main device which results changes in the obtained companion content that is rendered on the secondary device.

19 Claims, 11 Drawing Sheets

ENTERTAINMENT COMPANION CONTENT APPLICATION FOR INTERACTING WITH TELEVISION CONTENT

BACKGROUND

1. Field of the Invention

The present invention relates to the field of computer and television entertainment, and more particularly, to providing companion content on a companion device, where the companion content relates to content being watched on a main display.

2. Description of the Related Art

With the exponential growth of computing and networking, television (TV) viewing has evolved significantly over the years. This evolution has brought a number of technologies that allow users to select programming content and stream content on-demand. Some programming content is pre-set to a schedule by media providers, while other content can be downloaded for instant viewing. Traditionally, media provider companies provide their own devices (i.e., cable, satellite, internet) and deliver access to the various content options based on the user's selected service level.

As more users connect to the internet using broadband connections, many new media providing companies have entered the space. These companies provide applications and sometimes devices, which unlock access to a wide array of media, such as movies, television shows, sports, etc.

Although these new devices provide access to the media, the level of interactivity is still rather static. If interactivity is provided, the interactivity is limited to selection of shows, and other functions found on traditional digital video recorders (DVRs). Thus, although internet access has been widely added to DVR-type devices, the internet is still used generally to obtain programming data, set programming and recordings, and to trigger downloading of on-demand programs.

It is in this context that the embodiments of the invention arise.

SUMMARY

Embodiments of the present invention describe methods and systems that provide companion content, associated with content rendered on a main device, at a secondary device. The presentation of the companion content is tied to content being viewed on the main device, content that has been previously viewed on the main device or content determined to be similar to what has been viewed on the main device. In one embodiment, the secondary device executes an application that establishes a connection between the secondary device and a device (e.g., set-top box, device module, connected TV, e.g., TV having a processor, memory, logic and internet access) that interfaces with the main device (i.e., TV display). Additionally, the application on the secondary device is capable of communicating with a server over the internet. The server executes a remote application that interacts with the application executing on the secondary device. The application on the server is configured to provide additional content to the secondary device. The additional content obtained from the server is in someway related to the content being viewed on the main device, related to content previously viewed on the main device or content that augments the content being shown on the main device.

In one embodiment, an algorithm of the application of the secondary device will detect data about the content being rendered on the main device. The detected data can be in the form of metadata associated with content being watched on the main device. In such an example, the metadata can identify various levels of detail regarding the content being watched. The details can include the title of the show or program being watched, the timestamp of content being watched, the actions occurring in the content being watched (e.g., live or recorded), as well as pausing data, recording data, and other data. This metadata is therefore continuously analyzed (or periodically analyzed) by the algorithm on the local application of the secondary device and the application of the server. Based on the analysis, the secondary device will receive the companion content for rendering, while the user watches on the display of the main device.

In one embodiment, the algorithm is partially executed on the secondary device and partially executed on the server. Thus, the secondary device will communicate with the server, and based on logic executed on the server, will return companion content to display on the secondary device. In one embodiment, the gathered companion content is formatted and rendered at the secondary device while the content is being rendered on the main device. As noted above, the algorithm, whether fully or partially executed on the server, will generate the companion content based on one or a combination of currently viewed content, previously viewed content, recommended content, viewing history, viewing history of users having similar viewing habits, combinations thereof, etc.

The application executing on the server and the secondary device enable dynamic rendering and refreshing of companion content at the secondary device that is tied to the content being rendered on the main device. Interaction with the companion content that is being dynamically presented and refreshed is possible. The changes in presented companion content is, in one embodiment occurring based on what content is being watched on the main device. The interaction will also provide links to the internet to obtain additional information, participate in some networking with others, communicate with other users, etc. Additionally, the use of the secondary device to render some of the content frees up the main device for rendering the content, enriching user's TV viewing while also enhancing the viewing experience by providing additional information without sacrificing display space on the main device.

It should be appreciated that the present invention can be implemented in numerous ways, such as, methods, systems and an apparatus. Several inventive embodiments of the present invention are described below.

In one embodiment, a method for providing companion content at a secondary device for a content being rendered on a main device is disclosed. The method includes establishing a connection between the secondary device and a device that interfaces with the main device so as to enable the secondary device to access and control the content being rendered on the main device. The method further includes detecting data associated with the content being rendered on the main device through the connection, wherein the data includes metadata associated with the content rendered on the main device. The metadata is communicated to a remote application over the internet. The remote application is configured to analyze the metadata to produce communication content that relates to the content rendered on the main device. Companion content for the content being rendered on the main device is obtained from the remote application and rendered on the secondary device while the content is rendering on the main device. The analysis of the metadata detects changes in the content being rendered on the main device which results changes in the obtained companion content that is rendered on the secondary device.

In another embodiment, a method for generating companion content for a secondary device based on content being rendered on a main device having a display is disclosed. The method includes detecting execution of a local application on the secondary device. The local application establishes a wireless connection between the secondary device and a device that interfaces with the main device. The local application connects to an application programming interface (API) through the connection to access the device that interfaces with the main device. The API provides metadata regarding content being rendered on the main device and access to control selection of what is rendered on the main device. The local application is interfaced over the internet with a remote application. The remote application is configured to receive and analyze at least part of the metadata received from the local application. The remote application is configured to produce companion content that relates to the content rendered on the main device. The companion content from the remote application is forwarded to the local application of the secondary device for rendering while the content is being rendered on the main device. Any changes in the content being rendered on the main device is detected based in part on the analysis of the metadata obtained from the local application. The companion content is refreshed from time to time on the secondary device based on the detected changes in the content being rendered on the main device.

In another embodiment, a system for providing companion content at a secondary device for a content being rendered on the main device is disclosed. The system includes a secondary device executing a local application. The local application is configured to establish a wireless connection between the secondary device and a device that interfaces with the main device. The local application connects to an application programming interface (API) of the device that interfaces with the main device. The local application also detects data associated with the content being rendered on the main device through the wireless connection. The local application receives data regarding the content being rendered on the main device and access to control selection of what is being rendered on the main device through the API of the device. The data includes metadata associated with the content being rendered on the main device. The local application processes at least a portion of the metadata locally in substantial real-time and communicates with a remote application over an internet to obtain the companion content using the metadata. The remote application is configured to analyze the metadata received from the secondary device to produce companion content that relates to the content being rendered on the main device. The local application renders the companion content on the secondary device in substantial real-time while the content is being rendered on the main device. The analysis of the metadata detects changes in the content being rendered on the main device. The changes in the content produce changes in the companion content that is rendered on the secondary device.

In yet another embodiment, a system for generating companion content for a secondary device based on content being rendered on a main device having a display is disclosed. The system includes a remote application executing on a server. The remote application is configured to detect execution of a local application on the secondary device. The local application establishes a wireless communication connection between the secondary device and a device that interfaces with the main device. The local application connects to an application programming interface (API) of the device to access the device. The API of the device provides metadata regarding content being rendered on the main device and access to control selection of what is being rendered on the main device through the wireless communication connection. The remote application executing on the server interfaces with the local application executing on the secondary device over an internet. The remote application receives the metadata from the local application executing on the secondary device in substantial real-time. At least a part of the metadata received from the local application is analyzed to produce companion content that relates to the content rendered on the main device. The companion content for the content is returned to the local application on the secondary device for rendering in substantial real-time. Any changes in the content being rendered on the main device are detected based in part on the analysis of the metadata obtained from the local application. The detection of changes in the content is reflected in the companion content being returned to the local application. The companion content rendered on the secondary device is refreshed from time to time based on detected changes in the content being rendered on the main device.

Thus, the embodiments of the invention provide an effective and efficient application tool that uses the display space on the main device and the additional real-estate space on the secondary device optimally. Interaction with companion content rendered and dynamically refreshed on the secondary device is possible. The companion content may includes links to the internet, interface to participate in some network with others and to communicate with others, etc.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and systems for providing companion content at a secondary device for content being rendered on a main device. The companion content includes content that is contextually and/or relationally tied to the content being rendered on the main device, content that was previously viewed, or content that is similar to what is being viewed on the main device. The companion content is presented in a manner that enables user interaction for controlling data of the content that is being rendered on the main device, with the network from which the companion content is obtained, with a social network and is able to rate the content and share information about the content. In one embodiment, the information provided on the secondary device includes information that a user may have sought by manual navigation of a network, such as the Internet. In another embodiment, the information is contextually related to what is being watched on the main device, and the information provides a wider understanding or augmentation of content for enjoying content on the main and companion devices, either simultaneously, serially, or intermittently during a session.

The secondary device executes an application that is configured to connect to a device that interfaces with the main device (or device that connects to a main device, e.g., a set top box) to detect and obtain data about the content, and to obtain additional information that is contextually tied to the content being rendered at the main device. The application on the secondary device processes the data obtained from the device and receives and renders the additional information obtained from the network on the secondary device. Rendering the additional information describing the companion content on the secondary device enables optimal use of the display space in both the main device and the secondary device, thus enriching the user's TV viewing experience without compromising on the quality. Additionally, the secondary device enables user interaction with the companion content, and also provides interactive controls that enable users to directly control what content is presented on the main device. When the user is interacting with the companion content, the user is also able to obtain additional information about the companion content as well as share information with other users (e.g., friends, buddies, social networking users, etc.).

Figure 1:
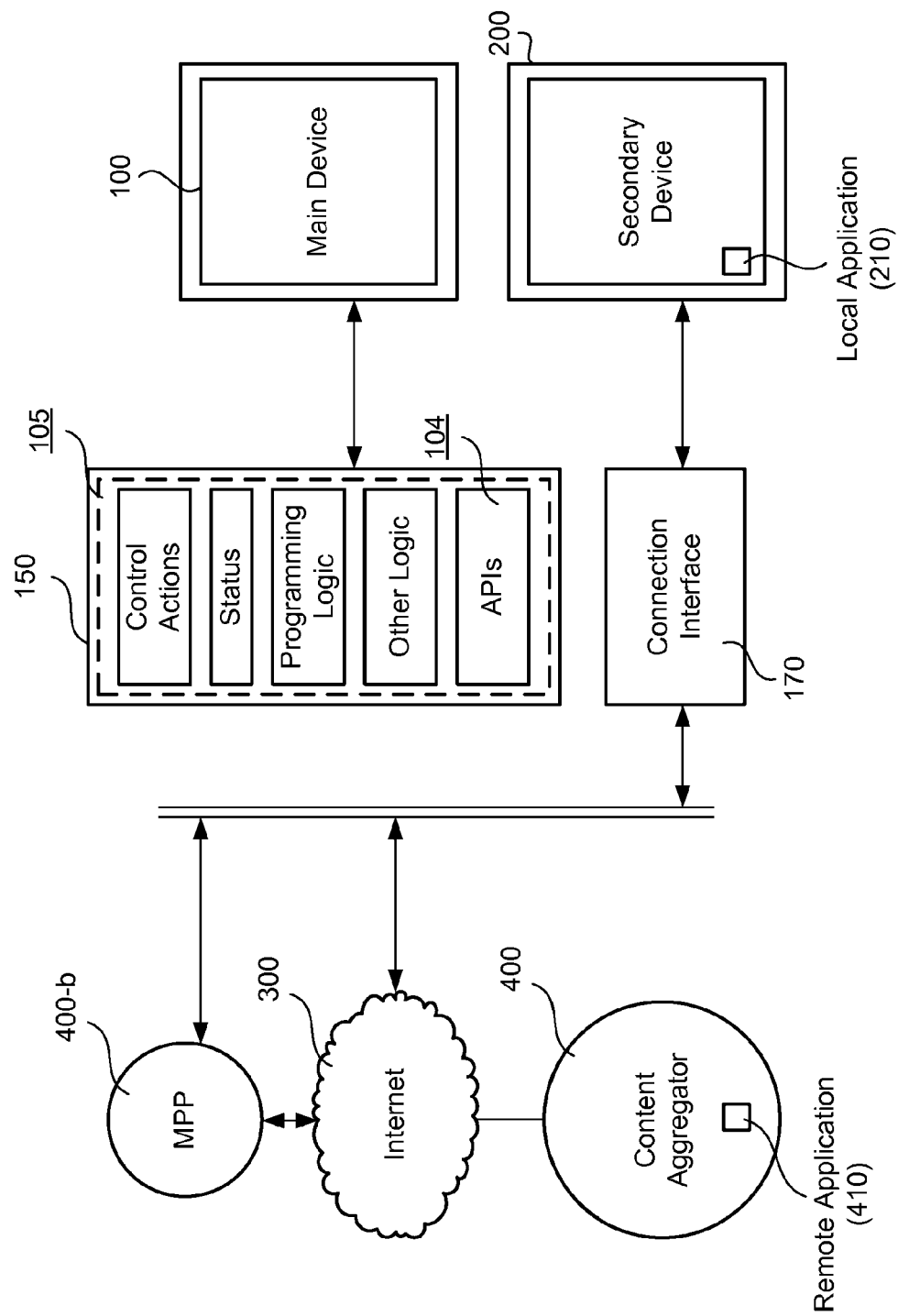
FIG. 1 illustrates a simplified block diagram of a system equipped with an algorithm for delivering companion content to a secondary device, in one embodiment of the invention.

With the brief overview, various embodiments of the invention will now be described in detail with reference to the figures. FIG. 1 illustrates a simplified block diagram of a system executing an application for delivering companion content to a secondary device, in one embodiment of the invention. The application can partly execute locally on the secondary device and partly execute remotely on a server over the network. The system includes a device (such as a device for interfacing with cable, satellite, and/or internet) that interfaces with a main device 100. The main device may be a television (TV) screen/monitor or a display device to render multimedia content, such as content, at the request of a user. The main device is communicatively connected to a network 300, such as the Internet, through a media interface 150 and a connection interface 170 to request and receive content distributed by one or more media programming providers (MPP) 400-b.

The device may be provided by a MPP 400-b and include programming and other logic to receive (directly or through a satellite or internet) and control content (e.g., live or recorded) being rendered on the main device 100. The connection interface 170 provides a communication interface between the media interface 150 that includes the device and other devices between the media interface 150 and the internet 300. The connection interface 170 may include one or more routers and one or more modems, that are used to establish communication connection (i.e. wired or wireless) between the main device 100 and the MPP 400-b over the Internet 300 and to convert content from the MPP received in a specific format to a format that is compatible with the main device. The device 105 may include control action logic, status logic, programming logic, other logic and circuitry to receive and process a request for content from the main device and receive and process the data for the content from the MPP and other content source providers. The device also includes an application programming interface (API) that enables the device to interact with the external devices. The API of the device 105 exposes the data associated with the content that is available at the device 105 to one or more external devices. As used herein, an API should be broadly construed to include any piece of code, module, or part of an application that has some defined communication protocol. The communication protocol enables applications, code or modules to communicate with one another and to pass information or receive control information.

The system also includes a secondary device 200, such as a connected device, that executes a local application 210. The local application 210 is configured to establish a communication connection between the secondary device and the device 105 that interfaces with the main device and between the secondary device and the internet 300. The local application 210 includes an API within for establishing the communication connection with the API of the device 105 and with the internet 300. The secondary device could be a laptop computer, a desktop or personal computer (PC), a tablet computing device, such as a iPad™, a mobile computing device, such as a personal digital assistant (PDA), mobile phone, or the like. The secondary device is not restricted to the aforementioned list of computing devices but may include other types of mobile/desktop devices that are capable of being communicatively connected through the APIs to the device that interfaces with the main device and the internet 300. The secondary device 200 also includes a display/rendering device for rendering information.

The local application 210 in the secondary device 200, upon activation, is configured to detect data related to a content being rendered on the main device, at the device 105 through the respective APIs. The data associated with content may include metadata. The local application 210 queries and obtains the data (i.e., metadata), processes at least a portion of the metadata and forwards some or all of the metadata to a remote application 410 over the internet 300 for further processing. The remote application 410 may be executing on a server that may be part of a content aggregator 400 and is communicatively interfaced with the local application. The remote application 410 uses the various resources available to the content aggregator for producing companion content. The content aggregator may include a plurality of servers that may each be executing a remote application related to the local application 210 executing on various secondary devices. The remote application 410 executing on the server of the content aggregator 400 detects the activation of the local application 210 through the interface and receives the metadata forwarded by the local application 210. The remote application 410 analyzes the metadata and uses resources available to the server through the content aggregator to collect additional content related to the metadata. Based on the analysis, the remote application 410 may conduct a search using a search query, collect additional content data from a plurality of content providers, from a specific content provider, or from any other available sources. The plurality of content providers may include social network service providers, and other promotional content providers (e.g., advertisers or suppliers/servers for providing advertising data). The remote application 410 aggregates the additional content obtained from the search and collected from various sources into companion content. It then organizes the companion content and returns the organized companion content to the local application 210 executing on the secondary device.

The local application 210 may further format the companion content before rendering the companion content on the display device associated with the secondary device while the content is being rendered on the main device. In one embodiment, detection through the API of the device, processing of at least a portion of the metadata locally, communicating on the internet and rendering of the companion content at the secondary device are performed by the local application 210 in the secondary device with little or no user action. Once companion content is presented on the secondary device, users are able to interact with the content, similar to interfacing with a website. In one embodiment, the local application 210 renders the companion content on the secondary device while detecting changes to the content being rendered on the main device. The changes to the content result in changes to the companion content that is received and refreshed on the secondary device from time to time.

Conventional applications were very cumbersome and manual. The users, while watching the content on the main device, manually connected to the internet, generated multiple queries and obtained some additional information. As the content being rendered on the main device changed, the user had to generate additionally queries and navigate to various sites to obtain information on the content, if desired.

The local application and the remote application work together to provide the appropriate companion content related to the content being rendered on the main device, in substantial real-time without any user inputs. The companion content rendered on the secondary device is refreshed from time to time as and when changes to the content rendered on the main device is detected. The companion content is in contextually related to the content being viewed, content that was previously viewed, content that is similar to the content currently being viewed or previously viewed and other contents that augment the content being viewed. The companion content is interactive, enabling access to control selection of the content being viewed, obtaining of additional information, and sharing the one or more companion content with other users making this a very versatile application tool.

Figure 2A:
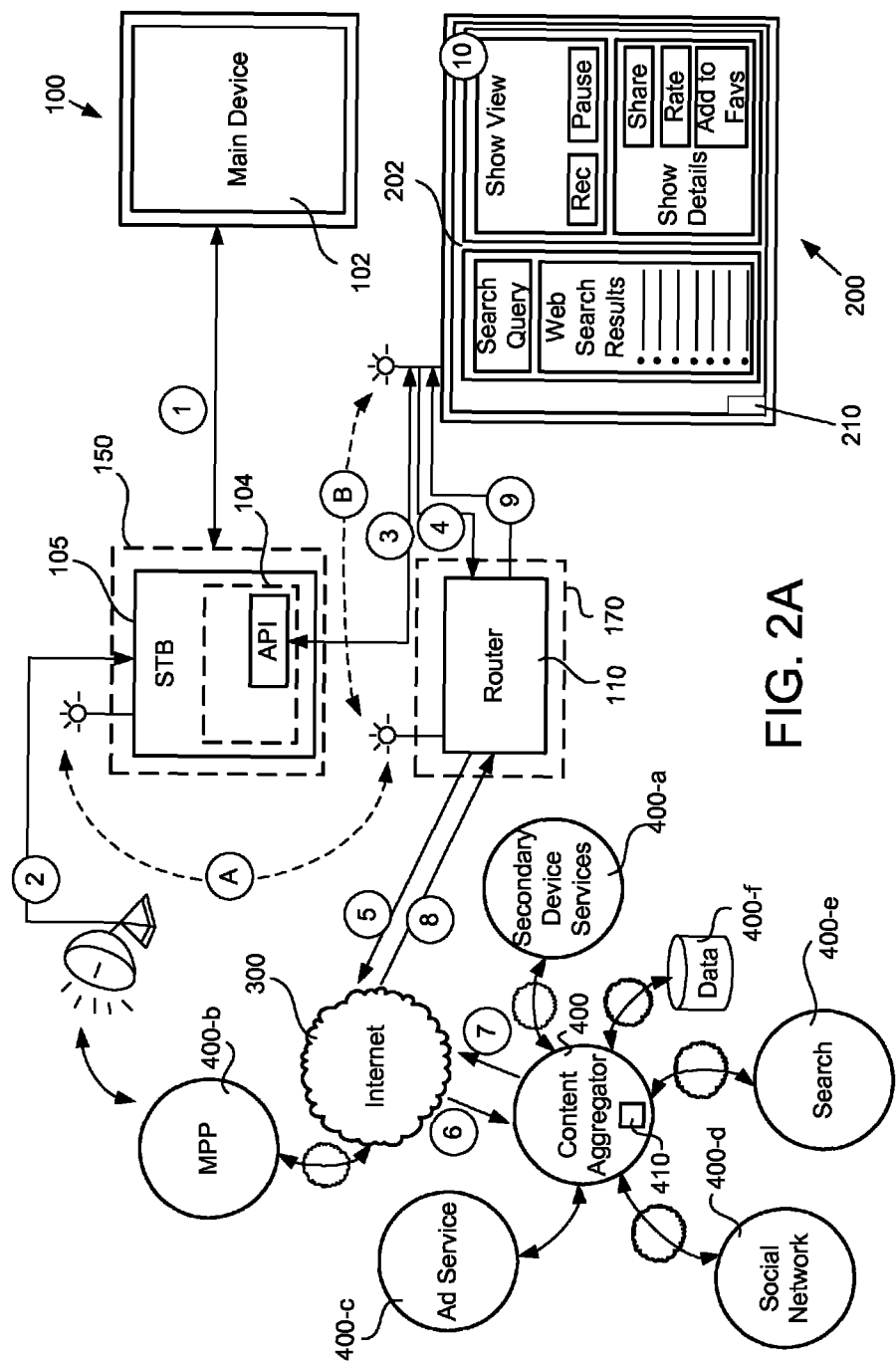
FIG. 2A illustrates a simplified block diagram identifying various modules through which data flows and the sequence of data flow within a system used in rendering companion content for a content, in one embodiment of the invention.

FIG. 2A illustrates data flow through the system used for providing companion content, in one embodiment of the invention. It should be understood, however, that the connection mechanics can change, depending on the available infrastructure, networks, and communication systems. In this example, the system includes a local application (e.g., APP) executing on a secondary device that establishes a wireless connection between the secondary device and a device 105 that provides an interface to a main device 100. The device 105 may be provided by a media programming provider (MPP) 400-b and include logic and circuitry to request, receive and process content from the MPP. The logic and the circuitry are used to control content being requested and delivered, determine and maintain status, process the content (such as recording, etc.), etc. The device 105 is capable of receiving signals for requested content directly from the MPP 400-b, through cable, the internet or through a satellite. The device 105 is also capable of formatting the content and forwarding it to the main device for rendering. The device 105 includes an API to interact with other devices. The device 105 is communicatively connected to a router 110 that is part of a communication interface 170 to communicate with a network, such as the internet 300. The communication connection between the device 105 and the router 110, in one embodiment, is a wireless connection, as illustrated by bubble 'A'.

The system includes a secondary device that executes a local application. The local application includes an API within to interact with the API of the device 105 to detect, request and receive data associated with a content that is being rendered on the main device.

In one embodiment, the term "query" can be the function of accessing or requesting data via a communication connection, channel, session, or exchange. In other embodiments, the term "query" can relate to the presentation of information from which additional information is retrieved. For instance, the information can be key words, codes, or messages that are forwarded to an application or module, and the application or module performs additional processing, such as searching to obtain various types of additional information, results, web data, or responses.

Furthermore, the content could be a live or recorded content received directly from a MPP, through a satellite or through the internet. The local application also establishes communication connection to the internet 300 through the router 110 in the communication interface 170. In one embodiment, the connection between the secondary device and the router 110 is wireless, as illustrated by bubble 'B'. The internet is connected to a server executing a remote application that is related to the local application executing on the secondary device. The server may be part of a content aggregator 400 that includes a plurality of servers each executing one or more remote applications. The remote application is configured to collect content from a plurality of sources. Some of the sources that provide content include secondary device service providers 400-a, MPP 400-b, promotional media content providers such as ad server 400-c, social network service provider 400-d, search content provider 400-e, content providers, television networks, such as CNN, NBC, ABC, BBC, etc., to name a few. It should be noted that the above list of sources is exemplary and should not be considered restrictive. In addition to the sources, the data could be provided by a plurality of database modules 400-f that store data related to content, users, or promotional media content or on any other related topics.

The data process flow begins with a main device requesting a content from the device 105, as illustrated by bubble '1'. The request may be obtained from a user through a control mechanism, such as a remote control. The device processes the request and may include a device identifier associated with the device 105 when forwarding the request to the appropriate MPP 400-b through the router 110. The MPP 400-b receives the request, validates the request to ensure that the request is from a valid device and is for a content that the device is authorized to receive. In one embodiment, the authorization to receive the content may be through a periodic subscription for the content agreed by a user of the device with the MPP 400-b. Upon validating the device and the content request, the MPP 400-b may direct a satellite to directly transmit the signal for the content to the device 105, as illustrated by bubble '2'. The device 105 receives the signal from the satellite and the logic and circuitry within the device 105 processes the signal, formats the signal (if necessary) and forwards the signal to the main device.

The local application activated at the secondary device detects the signal for the content received at the device and queries the device 105 through the respective APIs to obtain data associated with the content, as illustrated by bubble '3'. In one embodiment, the local application queries/polls the device 105 periodically to obtain data related to the content being rendered on the main device. In another embodiment, the local application may query/poll the device 105 continuously so long as the content is being received from the MPP (i.e., through the satellite) and rendered at the main device. In yet another embodiment, the local application may query/poll the device 105 based upon triggering of an event (such as a 'Play' button being pressed after a 'Pause'). In one embodiment, the device 105 acts as a web server receiving and servicing the queries/polls from the local application in the secondary device.

The data detected and obtained by the local application, in one embodiment, is in the form of metadata associated with content that is being rendered on the main device 100. The metadata identifies various levels of detail regarding the content being watched and that the device 105 exposes to the local application, including title of the show, program being watched, time stamp of the show, various details of scenes being rendered, etc. In addition to the aforementioned details of the show, the metadata/data may include pausing data, recording data and any other controlling data, status of the show, and other programming details that the logic within the device 105 exposes through the API.

The local application processes at least a portion of the metadata received from the device 105 in substantial real-time locally at the secondary device. The local application analyzes the metadata to determine which metadata needs to be processed locally and which metadata needs to be forwarded to a remote application for further processing. Based on the analysis, the local application forwards at least a second portion of the data/metadata to the router 110 for further processing, as shown by bubble '4,' for onward transmission to the internet, as shown by bubble '5'. The internet forwards the data received from the local application through the router 110 to the remote application executing on a server associated with the content aggregator 400, as shown by bubble '6'.

The remote application detects execution of the local application at the secondary device through the interface and waits to receive interaction from the secondary device. Upon receiving the metadata, the remote application analyzes the metadata in substantial real-time to produce companion content. The analysis of the metadata may include interacting with a plurality of sources to collect content that match or relate to the metadata and to conduct a search using a search query. The sources from which the remote application collects may include one or more third party content providers, specific content provider(s) or any combination thereof. The remote application may also generate a search query based on the analysis of the metadata and use the search query to obtain search results. The content from various sources and the search results are collected to generate the companion content for the metadata. The remote application then formats the companion content and returns the formatted companion content through the internet, as shown by bubble '7' to the router 110, as shown by bubble '8'. The formatting of the companion content at the server may be based on the secondary device that forwarded the metadata. The router 110 forwards the companion content to the secondary device, as shown by bubble '9'. The local application in the secondary device renders the companion content on the display device associated with the secondary device in substantial real-time, as shown by bubble '10,' while the content is being rendered on the main device. The local application continues to detect changes to the content rendered on the main device and receives companion content that reflects the changes. The companion content rendering on the secondary device is periodically refreshed from time to time to reflect the changes to the content in the main device. In one embodiment, refreshing might be, for example, after 2 seconds, 3 seconds, 5 seconds, or after the user watches a new channel or program for a period of time. Providing a delay in refreshing may reduce the number of times companion content changes on the secondary device during channel surfing, to avoid too fast of changes appearing on the display of the secondary device, which might be distracting.

The processing of metadata by the remote application may include one or more promotional data within the companion content (e.g., ads in the form of text, links, banners, icons, symbols, etc.). The promotional content may be related to the content being rendered on the main device, related to the secondary device, or related to a promotional media provider that has requested for inclusion of the promotional content. In one embodiment, during the analysis of the metadata, the remote application may identify a promotional content that is being rendered with the content on the main device. In this embodiment, the remote application may identify and include the promotional content identified through the metadata for including in the companion content for rendering on the secondary device. In one embodiment, a promotional media provider may request for such data to be included when generating the companion content for the secondary device. For instance, a sponsor of a particular content that is rendering on the main device may request for placement of the promotional content on the secondary device.

In one embodiment, the application for providing companion content executes partially on the secondary device and partially on the server. In this embodiment, the local application would be an extension of the server application. Thus, the secondary device will communicate with the server and based on logic executed on the server, appropriate companion content will be collected, formatted and returned for display on the secondary device. The application, whether fully or partially executing on the server, will generate the appropriate companion content for the metadata associated with the content. The companion content could include content related to currently viewed content, previously viewed content, recommended content, viewing history of users having similar viewing habits, based on an explicit request received from the secondary device, or any combination thereof, etc. The companion content is periodically refreshed to reflect changes to the content being rendered on the main device.

The rendered companion content is interactive in that a user can select a particular companion content to control the content being rendered on the main device, request additional content, share the content, rate the content, etc.

Figure 2B:
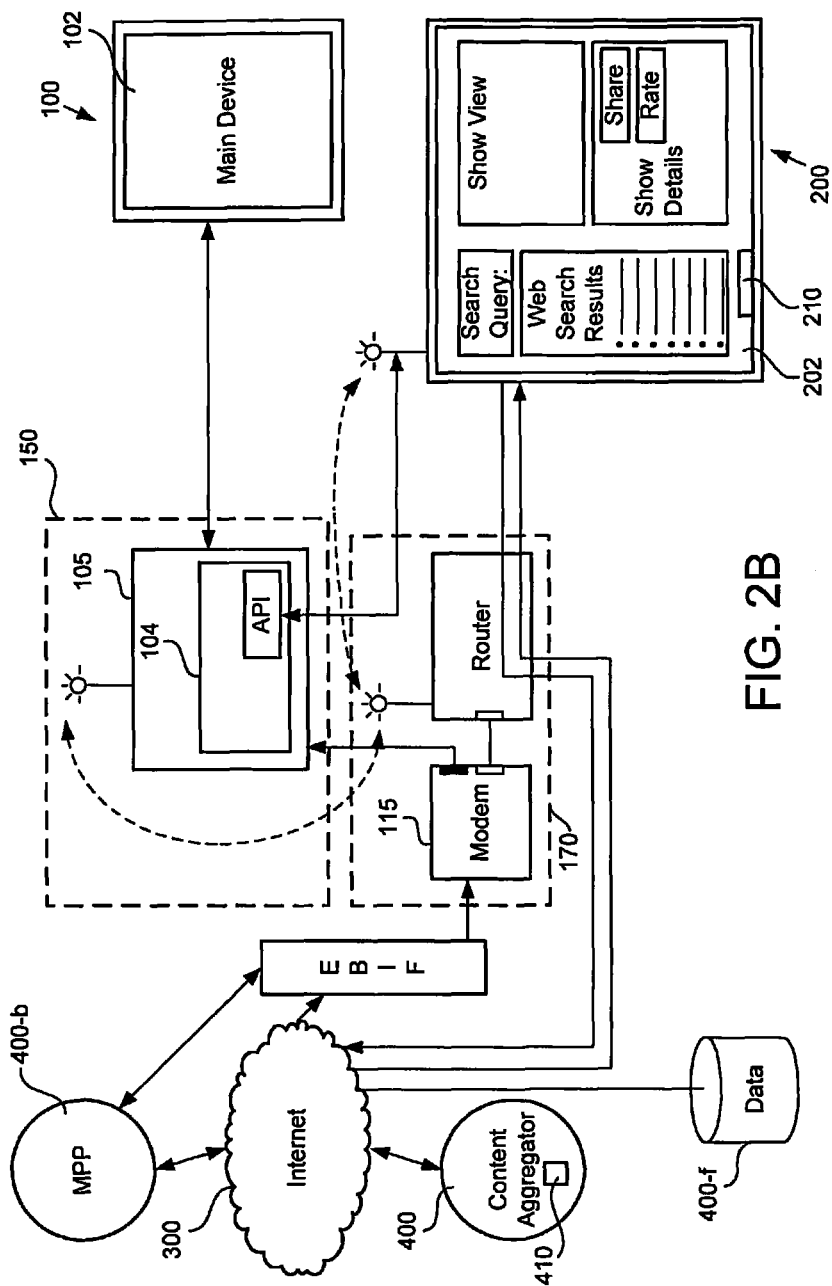
FIG. 2B illustrates an alternate embodiment illustrated in FIG. 2A.

FIG. 2B illustrates an alternate embodiment of the system used in providing companion content for the content being rendered on the main device. The various devices and interconnectivity between various devices are similar to what was described with reference to FIG. 2A. As a result, devices that are identified using the same reference numerals. The difference is in the format of the content being received at the device 105 in response to a request for content from the main device 100. In this embodiment, the content received from the MPP 400-b is in a specific format, such as an Enhanced TV Binary Interchange Format (EBIF). Although a specific format has been described with reference to FIG. 2B, it should be noted that the specific format is exemplary. As a result, other formats may also be used so long as the media interface and the connection interface are capable of handling and formatting the content to a format that is compatible for rendering on the main device. In order for the device 105 to process the content provided in this format, the system includes a modem 115 (modulator-demodulator) for converting the content from the EBIF to a format that is compatible with the device 105 for rendering on the main device 100. The MPP 400-b is connected to the device 105 through a cable modem within the connection interface 170. As a result, when a request from the main device for content is received at the device 105, the device 105 processes the request, identifies the MPP and forwards the request through the router 110 and modem 115 to the MPP 400-b. The MPP validates the request and forwards the requested content to the device 105 through the modem 115. The local application detects the data and follows the path described with reference to FIG. 2A to receive the companion content directly from the remote' application through the router 110 and the internet 300.

Figure 2C:
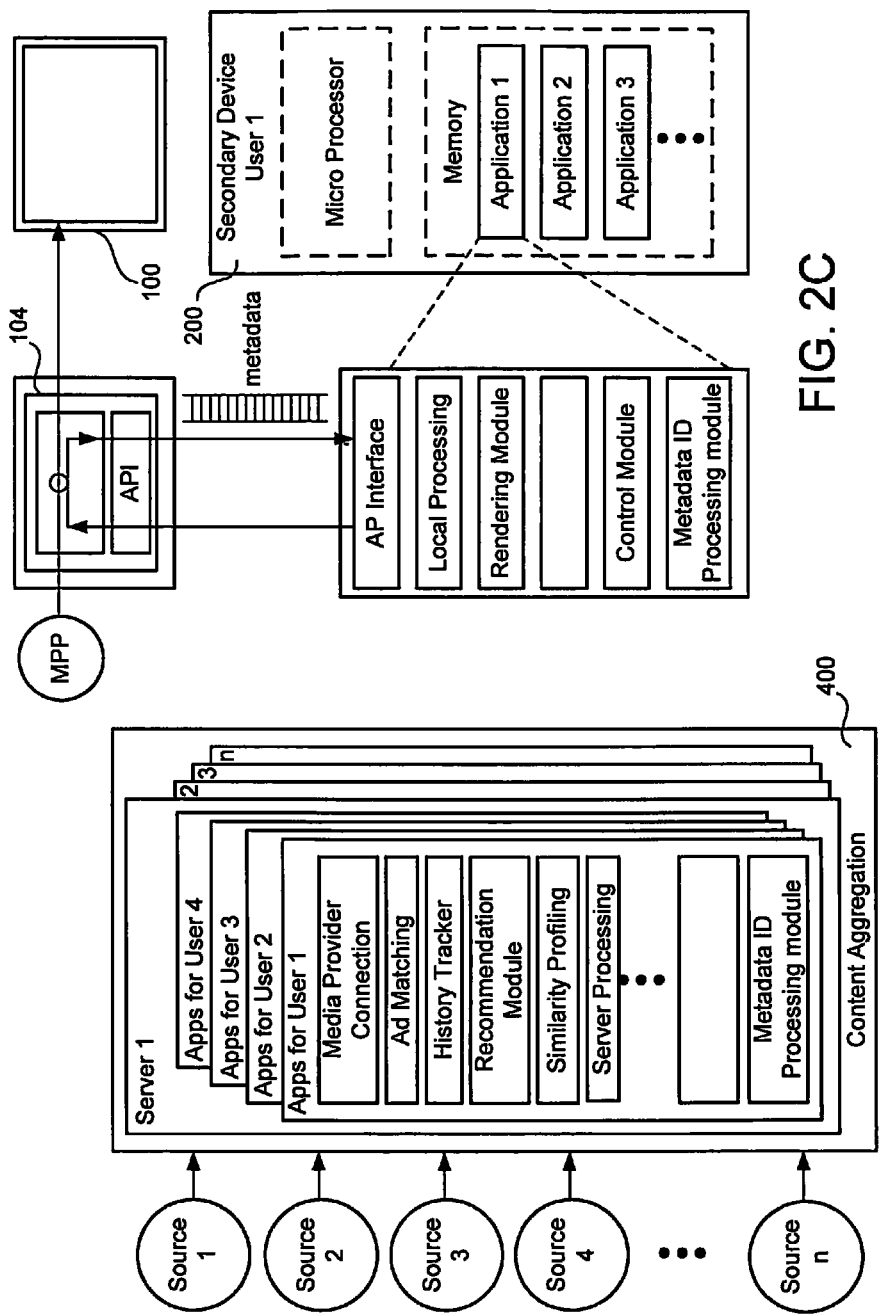
FIG. 2C illustrates a simplified block diagram illustrating the various modules of the system used in gathering and rendering companion content for a content, in one embodiment of the invention.

FIG. 2C illustrates the various modules within the local application and the remote application used in providing companion content that is tied to the content rendered on the main device. As illustrated, the secondary device includes a micro-processor and a memory for storing applications and other data related to the applications. The secondary device executes a plurality of applications including a local application that is used in detecting data and for receiving and rendering companion content at the secondary device. The local application includes a plurality of modules and an application programming interface (API) for establishing communication connection with other devices for interaction, such as the device 105 and a server device executing a remote application. The plurality of modules may include a local processing module, a rendering module, a control module, metadata identifier (ID) processing module, to name a few. The API at the local application is used to interact with the API of the device 105. Through the API, the local application detects content being rendered on the main device, queries and receives data related to the content being rendered on the main device. As mentioned, the content could be live or recorded content received directly from a MPP, a satellite or through the internet. As mentioned earlier, the data may be in the form of metadata that defines the content being rendered on the main device. As the data is received at the secondary device, the local application processes the data in substantial real-time.

The local processing module within the local application analyzes at least a portion of the metadata to determine which metadata can be processed locally and which metadata needs to be forwarded to the remote application for further processing. The control module may interact with the device 105 through the respective APIs and may be used to actively detect the data at the device 105, provide control commands to the device 105 for controlling selection of the content that is being rendered on the main device, determine status of the content at the device 105 and perform other control process. The metadata ID processing module interprets the metadata to determine what data is being received in the metadata. The metadata ID processing module may interact with a metadata interpretation table to interpret the metadata. The metadata interpretation table may be provided by the MPP and maintained locally on the secondary device or may be maintained remotely on the internet and made available to the local application executing on the secondary device through the API.

Based on the analysis, the local processing module may identify and process a portion of the metadata that is identified for processing locally.

The metadata that needs to be processed by a remote application is forwarded by the local application in substantial real-time to a server over the internet. The server is executing the remote application that is related to the local application executing on the secondary device. The server may be part of a content aggregator 400 and may be identified by the local application. The remote application uses the resources available at the content aggregator to process the metadata and generate companion content. The content aggregator 400 may include a plurality of servers each running a plurality of applications and access to plurality of resources to service the request from the remote application. The remote application detects the activation of the local application on the secondary device and is configured to receive the metadata over the internet. The remote application includes a plurality of modules that are configured to interact with a plurality of resources available to the server and process the metadata received from the local application of the secondary device. As a result, the remote application may include a metadata ID processing module that receives the metadata from the secondary device and interprets the received metadata. As mentioned earlier, the metadata ID processing module of the remote application is similar in function and scope to the one described with reference to the local application. As a result, the metadata ID processing module may also interact with the metadata interpretation table to interpret the metadata to identify details of the metadata. The metadata interpretation table may be provided by a media programming provider (MPP) that is providing the content for rendering at the main device. In one embodiment, the content aggregator 400 may store metadata interpretation table for each MPP in a metadata repository and make it available to the metadata ID processing module in both the remote application and the local application. The details of the metadata may include MPP identifier, channel identifier, show identifier, show screen identifier, etc., and the metadata interpretation table may interpret the metadata to identify the data contained within the metadata.

Based on the interpretation of the metadata, a server processing module in the remote application may automatically generate a query request that describes the content. The server processing module may parse the content identifier, show identifier, show screen identifier, etc., to identify keywords and use the keywords to generate the query request that substantially describes the content. The processing logic may use the keywords as search parameters in a search query. The search query may interact with a search engine to obtain the search results that match the search query. The search results are used as part of the companion content returned to the secondary device.

The interpreted metadata may also be used to collect additional content. For instance, the interpreted metadata may be used by a history tracker module within the remote application to collect content related to content previously viewed. The interpreted metadata may also be used by the server processing module to collect additional content from a specific MPP that provided the content for rendering on the main device. A recommendation module may use the interpreted metadata to identify and collect popular content, content that are in the news, content related to the content that is being rendered on the main device, etc. In order to tailor the content retrieved by the recommendation module to the specific user or specific secondary device, a user identifier or a device identifier received with the metadata may be used. A similarity profile matching module may use the device/user identifier along with the interpreted metadata to identify content that are identified as favorites or are popular with a group of users that have profile that are similar to the user's profile. The similarity profile matching module may interact with a history tracker to identify content that was previously viewed by the user/at the device. The similarity profile matching module may use the identified content from the history tracker to determine the user's viewing profile and use the viewing profile to identify a user group whose viewing profile matches the user's viewing profile to recommend content.

In addition to the collected content, the server processing module may identify and provide interfaces to one or more social network to communicate with others and share one or more aspects of the companion content with other users and a control interface to control the content being rendered on the main device and to provide rating on the content. As can be seen, the various modules within the remote application collect data from various sources for including in the companion content. The remote application includes an ad matching module to identify a promotional content that matches the metadata based on the analysis.

The server processing module aggregates all the collected content, including the search results, organizes the aggregated content into companion content, formats the companion content to comply with the secondary device requirements. The organized companion content is forwarded to the local application executing in the secondary device for rendering.

A rendering module in the local application receives the formatted companion content, processes to include any locally processed data and renders it on the display device of the secondary device in substantial real-time. The speed of processing the metadata to generate companion content and the speed of refreshing the companion content to reflect the changes detected in the content may be driven by the bandwidth shared between the secondary device and the server at the content aggregator. The broader the bandwidth shared, faster the processing and rendering/refresh. The rendering on the secondary device is performed while the content is being rendered on the main device and while the local application is actively detecting changes to the content being rendered on the main device. The detection of changes to the content results in refining the companion content so as to reflect the changes to the content rendered on the main device. The companion content rendered on the secondary device is refreshed from time to time in response to the changes detected in the content. The process of detecting the changes and refining the companion content continues so long as the content is being rendered on the main device or so long as the secondary device is connected to the device 105. Although the embodiments have been described in detail with reference to obtaining companion content for content being rendered on the main device, it should be noted that the embodiments may be extended to obtaining content for content that is not rendered on the main device but is available through the companion content. The remote and the local applications provide the user with flexibility to use the companion content to receive additional content that is rendered on the secondary device.

Figure 3A:
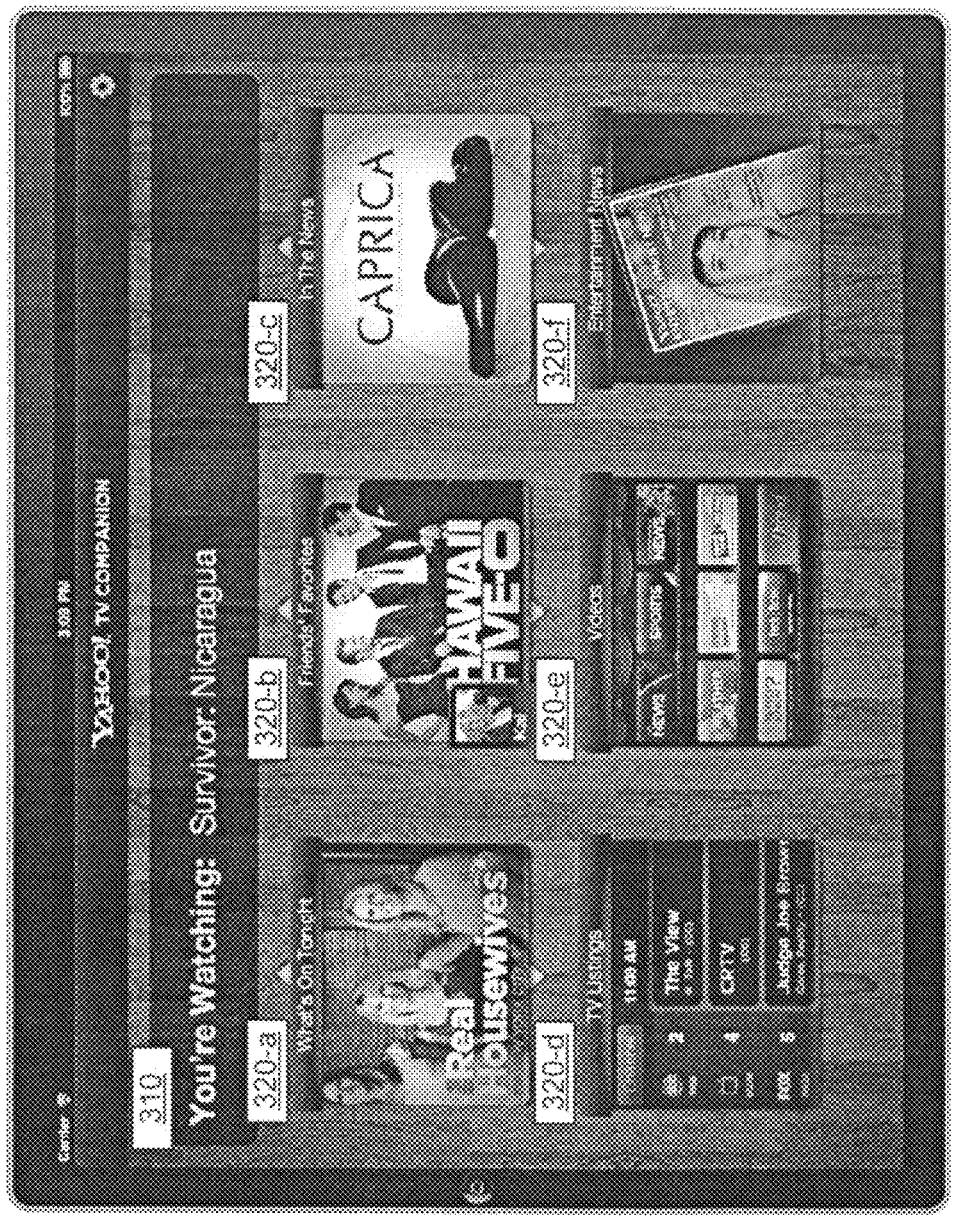
FIG. 3A illustrates a sample view of a home screen rendered on a secondary device, in one embodiment of the invention.
Figure 3B:
FIG. 3B illustrates a sample view of a program guide on a secondary device, in one embodiment of the invention.
Figure 3C:
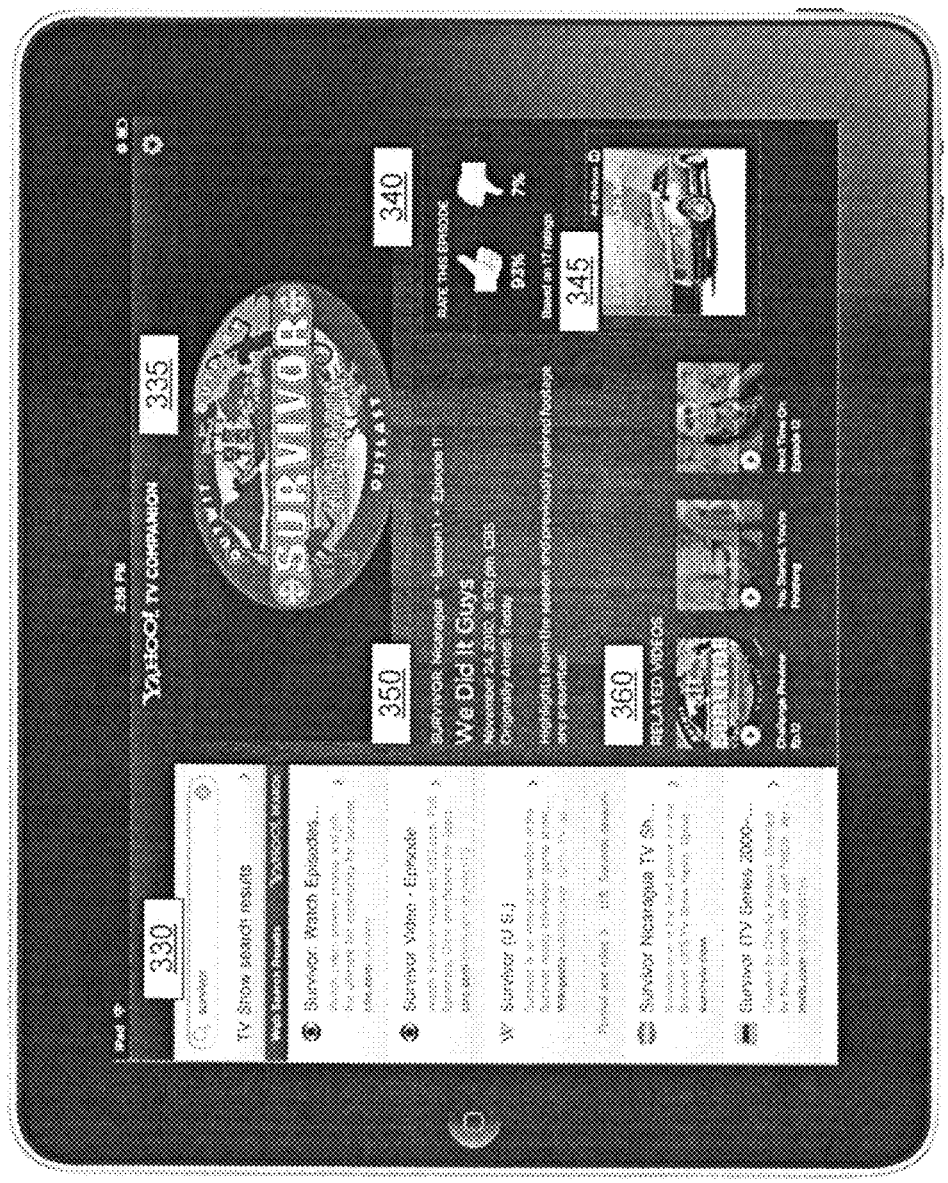
FIG. 3C illustrates a sample view of companion content rendered on a secondary device, in one embodiment of the invention.

FIGS. 3A-3C illustrate sample screen views of companion content rendered on the secondary device, in various embodiments of the invention. FIG. 3A illustrates an 'Application Home Screen' rendered on the display device of the secondary device while content is being rendered on the main device. As indicated in the top box 310 indicates the content that is being rendered on the main device, "Survivor: Nicaragua," while the companion content is rendered on the secondary device. The application home screen includes plurality of tiles 320*a-f* representing different content options that are rendered on the secondary device and are available for interaction. The content for the application home screen is extracted from the companion content returned by the remote application in response to the metadata forwarded by the local application on the secondary device. The "What's On Tonight" tile 320-*a* may include all the contents that the remote application may have collected based on popularity and day/time of day, in one embodiment. The "Friend's Favorites" tile 320-*b* may include content that has been identified as being popular among a social network of users, in one embodiment. In another embodiment, the "Friend's Favorites" tile 320-*b* may include a specific user's favorite shows as identified by the remote application based on previous viewing history of the specific user. Other tiles include "In The News" 320-*c*, "TV Listings" showing a program guide with details of all shows available for viewing, "Videos" tile 320-*e* that identifies various videos available that is related to the content or related to the user based on viewer's viewing habits or favorite/.popular videos as determined by the remote application, "Entertainment News" 320-*e*, etc. The application home screen is just an exemplary sample screen and should not be considered restrictive.

FIG. 3B illustrates a sample expanded view of a program guide screen 320-*d* that was rendered in FIG. 3A. As shown, the top half of the screen rendering a plurality of tiles representing different entertainment shows 320-*g* that is identified based on what is popular or based on what is available or based on the user's favorites. The entertainment shows may be the same as the one rendered as 320-*f* tile in FIG. 3A or may be different. In addition to the plurality of tiles, the top half of the screen may also include a dedicated ad space to render a promotional content 320-1. As mentioned earlier, the promotional content may be provided by the remote application based on the monetary realization or based on the content or user or the secondary device. The bottom half of the screen may be devoted to rendering the program guide as related to the content being rendered on the main device. The bottom half of the screen may also include one or more interactive controls 325 provided by the remote application to control the content being rendered on the secondary device, in one embodiment. In another embodiment, the interactive controls 325 may be used to control the content being rendered on the main device. It should be noted that the rendering of the program guide as illustrated in FIG. 3B is exemplary and that other styles and combination of content may used.

FIG. 3C illustrates a "Companion Content" view as displayed on a display device screen at the secondary device, in one embodiment of the invention. In this embodiment, the screen includes companion content for the content rendered on the main device. The companion content includes the content data 335 that is contextually tied to the content being rendered on the main device. In addition to the content data, the screen also includes the ratings for the content 340, detailed information of the content 350, and related videos 360, and content that are related to the content. The screen also includes search results 330 for a search query, which was generated based on the metadata of the content currently rendering on the main device. As can be seen, the content being rendered on the main screen is a TV show, "Survivor: Nicaragua," the search query includes the search parameter "Survivor" and the search results relate to the search query and the content. The user can interact at any of the companion content data rendered on the secondary device and be able to select/navigate based on the selection. The screen also provides a dedicated ad space 345 for rendering additional promotional content based on the content being rendered on the main device. In one embodiment, this dedicated ad space 345 may be used to render the promotional content that is being rendered on the main device. The remote application may have provided the promotional content based on what was being rendered on the main device and/or based on the analysis of the metadata, during the content aggregation.

Figure 3D:
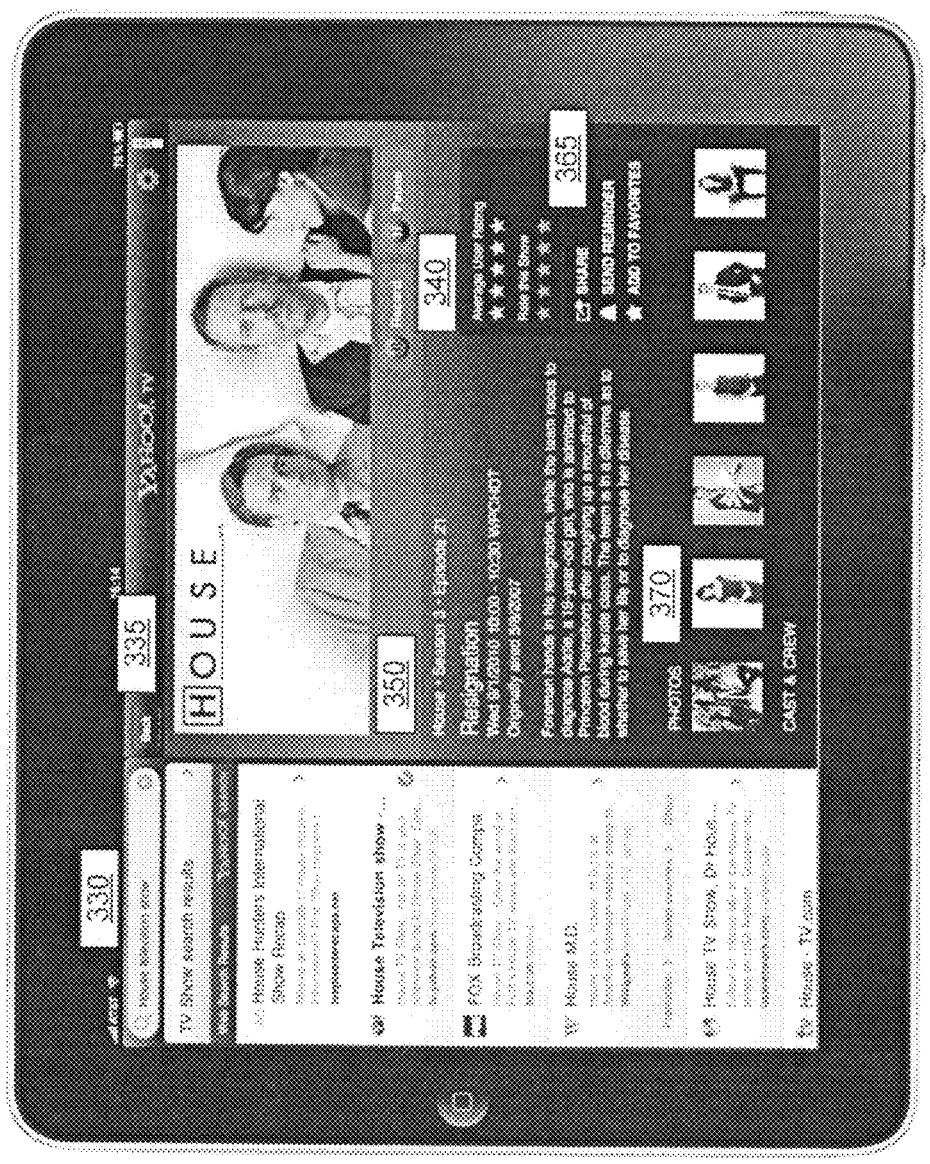
FIG. 3D illustrates an alternate view of companion content rendered on a secondary device, in one embodiment of the invention.

FIG. 3D illustrates an alternate "Companion Content" view, in one embodiment of the invention. FIG. 3D also illustrates some companion content data that is not rendered in FIG. 3C. In response to the user selecting a TV show, "House," the algorithm generates a search query using the search parameter of "House" and adds additional search parameters "television show." The search results 330 obtained with the search parameters are rendered on the secondary device. Additionally, the companion content rendered on the secondary device includes social network interface 365 for interaction with other users on the social network and photos 370 of the content. The content rating option 340 may also be provided as interactive data as compared to informational data, as illustrated in FIG. 3C.

Figure 4:
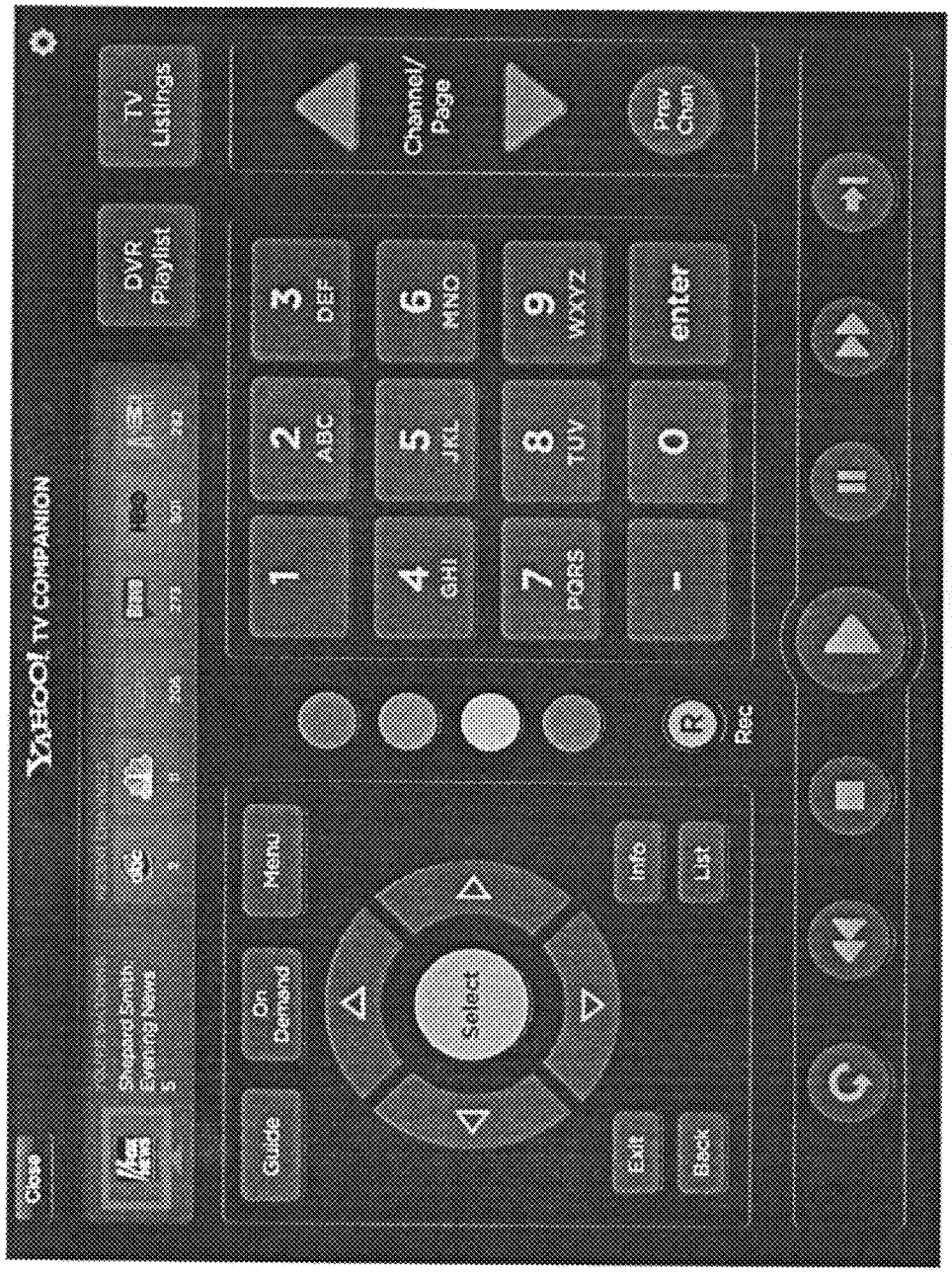
FIG. 4 illustrates a view of a sample on-screen remote control on a secondary device that is used to control the main device, in one embodiment of the invention.

FIG. 4 represents an on-screen version of a control mechanism, such as a remote control, rendered on the secondary device that can be used to interact with the device 105 and control the content being rendered at the main device. In one embodiment, the remote application may provide the on-screen control mechanism along with the companion content to enable interaction with the content being rendered on the main device. The remote control includes a plurality of interactive controls in the form of buttons to select and manage the content on the main device. The interactive controls are similar to the ones that are available in a standard remote control. In addition to providing the control capability, the remote control may include explanation of the functionality of each interactive control button so that even a novice user is able to navigate through the various options.

As can be seen, the various embodiments provide an efficient application tool that makes optimal use of display space on the display devices associated with the main device and the secondary device while providing the capability for interaction over the internet. The user is provided with the companion content that is periodically refreshed to reflect changes detected in the content being rendered on the main device.

Figure 5:
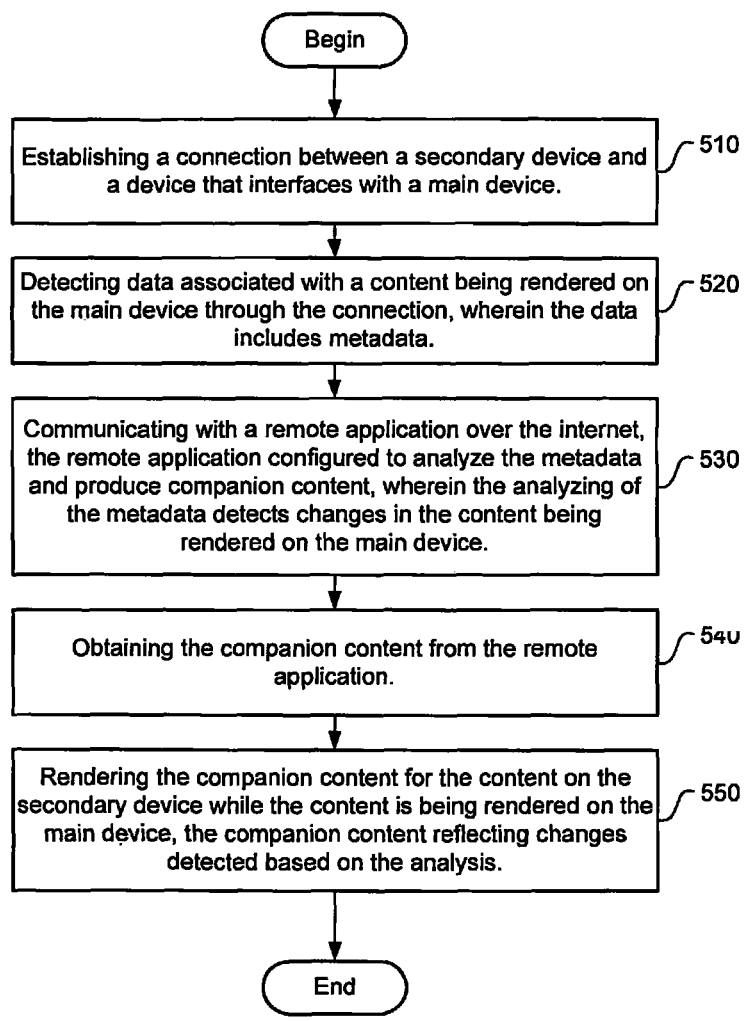
FIG. 5 illustrates a flow chart of process operations used in providing companion content at a secondary device, in one embodiment of the invention.

FIG. 5 illustrates a flow chart of process operations used in providing companion content at a secondary device, in one embodiment of the invention. The process begins with establishing a connection between the secondary device and a device that interfaces with the main device, as illustrated in operation 510. The connection enables the secondary device to access and control the content being rendered on the main device. The main device is connected to a network, such as the internet, through the device using a router and the secondary device is interfaced with a remote application over the network using the router. Using the connection, a local application in the secondary device detects data associated with the content rendering on the main device, as illustrated in operation 520. The secondary device sends a request to the API on the device through an API contained therein requesting data on the content being rendered on the main device. The API, in turn, provides the data about the content that is exposed for sharing by the device. The data may be in the form of metadata that describes the content being rendered on the main device. The local application at the secondary device communicates with a remote application over the internet, as illustrated in operation 530. The communication includes forwarding the metadata to a server executing the remote application for further processing.

The remote application receives the metadata forwarded by the local application and analyzes the metadata to produce companion content that relates to the content rendered on the main device. Based on the analysis, the remote application may interact with a plurality of sources to identify and collect content that relates to the content rendering on the main device. The remote application may also generate a search query and conduct a search to obtain search results for the search query. The remote application organizes the collected content and search results into companion content, organizes the companion content into a format that complies with the requirements of the secondary device and returns the organized companion content to the secondary device for rendering. The local application receives the organized companion content from the remote application, as illustrated in operation 540. The organized content is rendered on the display device of the secondary device, as illustrated in operation 550. The analyzing of the metadata at the remote application includes detecting changes in the content being rendered on the main device as reported by the local application. The companion content returned to the secondary device reflects the detected changes to the content and the secondary device refreshes the companion content from time to time to reflect the changes in the content at the main device.

Figure 6:
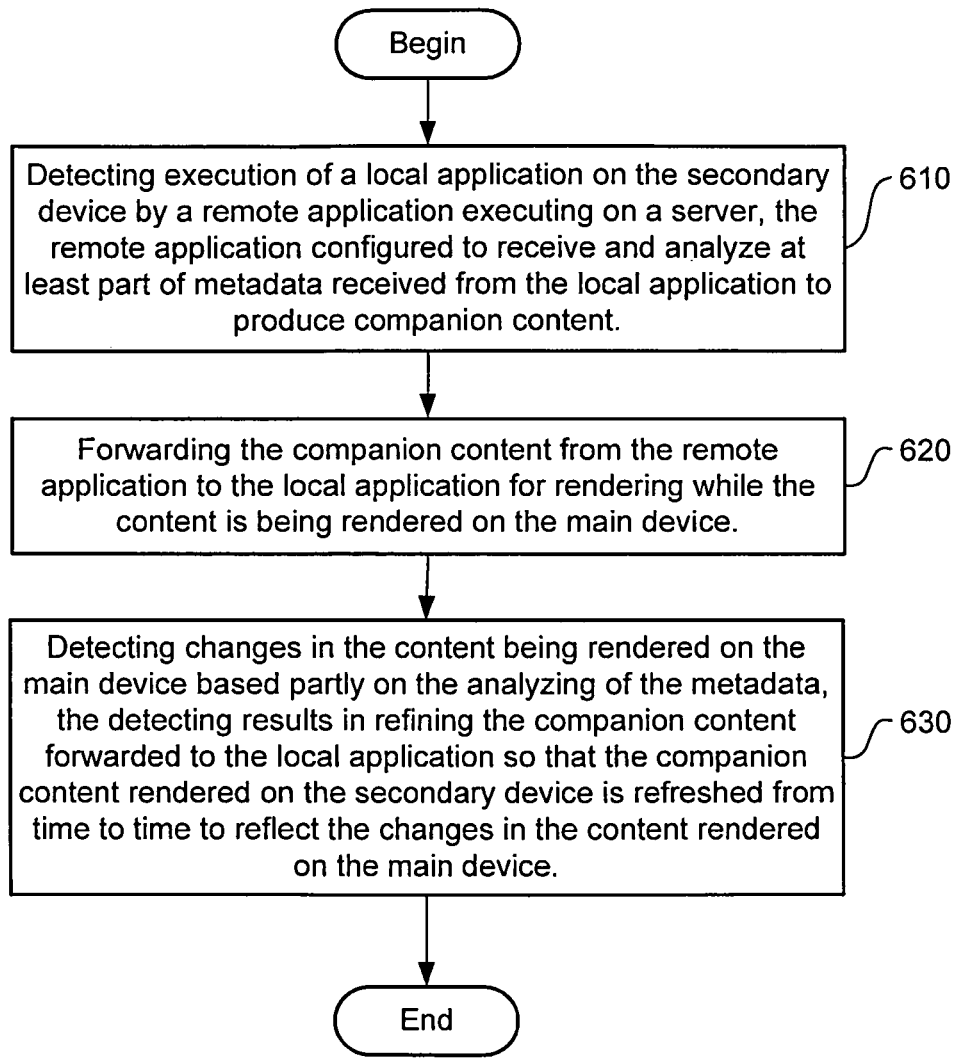
FIG. 6 illustrates a flow chart of process operations used in providing companion content at a secondary device, in an alternate embodiment of the invention.

FIG. 6 illustrates a flow chart of process operations used in generating companion content for a secondary device based on content being rendered on a main device, in an alternate embodiment of the invention. The process begins with a remote application detecting execution of a local application on the secondary device, as illustrated in operation 610. The local application establishes a wireless communication connection between the secondary device and a device that interfaces with the main device. The connection is enabled through an application programming interface (API) in the device. The API provides the metadata regarding content being rendered on the main device and access to control selection of the content being rendered on the main device. The local application is interfaced with the remote application over the internet.

The remote application is configured to receive the metadata from the local application and analyze the metadata to produce companion content that relates to the content being rendered on the main device. The remote application may interact with a plurality of sources available at the server to collect content related to the metadata and may also conduct a search using a search query to obtain search results. The collected content and search results are aggregated to produce the companion content. The aggregated companion content is forwarded to the local application of the secondary device for rendering while the content is being rendered on the main device, as illustrated in operation 620.

The remote application detects changes in the content being rendered on the main device based on the analysis of the metadata received from the local application, as illustrated in operation 630. The detected changes result in the refining of the companion content that is forwarded to the local application. The companion content rendered on the secondary device is refreshed from time to time to reflect the changes in the companion content that relates to the detected changes in the content. The process continues so long as the secondary device is executing the local application or so long as the content is being rendered on the main device.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing companion content on a secondary device for content being rendered on a main device, comprising:
    detecting a connection between the secondary device and a device that interfaces with the main device, the connection enabling access and control of the content being rendered on the main device by the secondary device;
    detecting data associated with the content being rendered on the main device, at the device, through the connection, the data includes metadata associated with the content rendered on the main device;
    communicating with a remote application over the internet, the remote application configured to analyze the metadata to produce companion content that relates to the content rendered on the main device;
    obtaining the companion content from the remote application; and
    providing the companion content to the secondary device for rendering while the content is being rendered on the main device,
    wherein the analyzing of the metadata detects changes in the content being rendered on the main device and produces changes in the obtained companion content that is provided to the secondary device, wherein the analyzing and obtaining of companion content including the changes to the companion content are performed without requesting user action at the secondary device.

2. The method of claim 1, wherein detecting a connection further includes,
    detecting connection of the secondary device to the device through an application programming interface (API) of the device and detecting connection to a network through a connection interface, wherein the API is configured to detect and provide access to the data of the content rendering on the main device and enable the secondary device to control the main device through the API.

3. The method of claim 1, wherein detecting the content further includes,
    detecting a request from the secondary device to an application programming interface in the device, wherein the request calls for data identifying the content rendered on the main device; and
    transmitting the metadata associated with the content through the API in response to the request.

4. The method of claim 3, wherein the request is sent periodically, after a period of time, continuously or in response to triggering of an event related to the content being rendered on the main device.

5. The method of claim 1, wherein detecting the content further includes,
    processing at least a portion of the metadata and identifying additional content for rendering on the secondary device, wherein the additional content is returned for rendering alongside the companion content or separately from the companion content.

6. The method of claim 5, wherein communicating with a remote application further includes,
    transmitting at least a second portion of the metadata defining the content to the remote application for further processing or for processing interactively using the local application.

7. The method of claim 1, wherein analyzing the metadata by the remote application further includes,
    performing one or more of (a) conducting a search using a search query, (b) collecting data content from a third party content provider, (c) collecting data content from a specific content provider based on the analysis of the metadata, (d) mining data associated with one or more users to identify data content and (e) assembling data for presentation in a specific order on the secondary device.

8. The method of claim 1, wherein in response to analyzing the metadata, the remote application obtains data from a social network service provider.

9. The method of claim 1, wherein in response to analyzing the metadata, the remote application obtains advertising data from one or more promotional content providers, the advertising data relates to the content presented on the main device or the secondary device.

10. A method for generating companion content for a secondary device based on content being rendered on a main device having a display, comprising:
    detecting execution of a local application on the secondary device, the local application establishing a wireless connection between the secondary device and a device that interfaces with the main device, the local application connecting to an application programming interface (API) to access the device that interfaces with the main device, the API providing metadata regarding content being rendered on the main device and access to control selection of what is rendered on the main device, wherein the local application is interfaced over the internet with a remote application, the remote application configured to receive and analyze at least part of the metadata transmitted by the local application, the remote application being configured to produce companion content that relates to the content rendered on the main device;

forwarding the companion content produced by the remote application, to the local application of the secondary device for rendering the companion content on the secondary device while the content is being rendered on the main device; and detecting changes in the content being rendered on the main device based in part on the analyzing of the metadata obtained from the local application, wherein the companion content returned for rendering on the secondary device is refreshed based on detected changes in the content being rendered on the main device, wherein the analyzing and obtaining of companion content including the detected changes are performed without requesting user action at the secondary device.

11. The method of claim 10, wherein producing companion content further includes, performing one or more of (a) conducting a search using a search query, (b) collecting data content from a third party content provider, (c) collecting data content from a specific content provider based on the analysis of the metadata by the remote application, (d) mining data associated with one or more users to identify data content, and (e) assembling data for presentation in a specific order on the secondary device, wherein the conducting of a search, collection of data, mining of data and assembling of data is performed by the remote application without requesting user action at the secondary device.

12. The method of claim 10, wherein in response to the analyzing of the metadata, the remote application obtains data from a social network service provider.

13. The method of claim 10, wherein in response to analyzing the metadata, the remote application obtains advertising data that relates to the content presented on the main device or the secondary device.

14. The method of claim 11, wherein conducting a search further includes, generating a search query based on the analysis of the metadata received from the local application executing on the secondary device; and obtaining search results based on the search query, the search results being included in the companion content returned to the local application by the remote application.

15. The method of claim 10, further includes providing a social network interface along with the companion content for presentation at the secondary device, the social network interface used for interaction within a social network.

16. The method of claim 11, wherein mining data further includes, mining historical data related to one or more users to identify content associated with the third party content provider or specific content provider; and collecting data content from the third party or specific content providers that is related to the content rendered at the main device or the secondary device, the data content collected from any one of the third party content provider or specific content provider returned to the secondary device with the companion content for rendering.

17. The method of claim 10, wherein detecting changes further includes, dynamically refining companion content based on the changes detected in the content during analyzing of the metadata by the remote application, the companion content reflecting the changes to the content on the main device is returned to the local application on the secondary device for rendering.

18. A system for providing companion content at a secondary device for a content being rendered on a main device, comprising:

a local application executing on the secondary device, the local application configured to, establish a wireless connection between the secondary device and a device that interfaces with the main device, wherein the local application connects to an application programming interface (API) of the device that interfaces with the main device;

detect data associated with the content being rendered on the main device through the wireless connection, wherein the local application receives data regarding the content being rendered on the main device and access to control selection of what is being rendered on the main device through the API of the device, wherein the data includes metadata associated with the content being rendered on the main device;

process at least a portion of the metadata locally in substantial real-time;

communicate with a remote application over the internet to obtain the companion content using the metadata, wherein the remote application is configured to analyze the metadata received from the secondary device to produce companion content that relates to the content being rendered on the main device; and render the companion content on the secondary device while the content is being rendered on the main device, wherein the analyzing of the metadata detects changes in the content being rendered on the main device and produces changes in the companion content that is returned for rendering on the secondary device, the analyzing and obtaining of companion content including changes to the companion content are performed without requesting user action at the secondary device.

19. A system for generating companion content for a secondary device based on content being rendered on a main device having a display, comprising:

a remote application executing on a server, the remote application configured to, detect execution of a local application on the secondary device, wherein the local application establishes a wireless communication connection between the secondary device and a device that interfaces with the main device, the local application connects to an application programming interface (API) of the device to access the device, the API of the device provides metadata regarding content being rendered on the main device and access to control selection of what is being rendered on the main device through the wireless communication connection, wherein the remote application executing on the server is interfaced with the local application executing on the secondary device over an internet;

receive the metadata from the local application executing on the secondary device in substantial real-time;

analyze at least part of the metadata received from the local application to produce companion content that relates to the content rendered on the main device;

return the companion content for the content to the local application on the secondary device for rendering in substantial real-time; and detect changes in the content being rendered on the main device based in part on the analysis of the metadata obtained from the local application, the detection of changes in the content is reflected in the companion content being returned to the local application, wherein the companion content returned for rendering on the secondary device is refreshed based on detected changes in the content being rendered on the main device, wherein receiving the metadata, analyzing at least part of the metadata, returning the companion content and refreshing the companion content based on detecting changes to the content rendered on the main device, is carried out by the remote application without requesting user action at the secondary device.

* * * * *